United States Patent
Hahn et al.

(10) Patent No.: US 8,773,820 B1
(45) Date of Patent: Jul. 8, 2014

(54) PZT MICROACTUATOR FOR DISK DRIVE SUSPENSION HAVING ELECTRICAL VIA AND WRAP-AROUND ELECTRODE

(71) Applicant: Magnecomp Corporation, Murrieta, CA (US)

(72) Inventors: Peter Hahn, Wildomar, CA (US); Kuen Chee Ee, Chino, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 14/182,285

(22) Filed: Feb. 17, 2014

Related U.S. Application Data

(60) Provisional application No. 61/767,620, filed on Feb. 21, 2013.

(51) Int. Cl.
*G11B 5/58* (2006.01)
(52) U.S. Cl.
USPC .................................................. 360/294.4
(58) Field of Classification Search
USPC ...................................................... 360/294.4
See application file for complete search history.

(56) References Cited

U.S. PATENT DOCUMENTS

| | | | |
|---|---|---|---|
| 4,383,363 A | 5/1983 | Hayakawa et al. | |
| 4,633,122 A | 12/1986 | Radice | |
| 5,376,860 A | 12/1994 | Sato | |
| 5,440,075 A | 8/1995 | Kawakita et al. | |
| 6,716,363 B1 | 4/2004 | Wright et al. | |
| 7,064,401 B2* | 6/2006 | Uchiyama et al. | 257/415 |
| 7,167,344 B2* | 1/2007 | Nakagawa et al. | 360/294.4 |
| 7,382,583 B2 | 6/2008 | Hirano et al. | |
| 7,538,985 B2* | 5/2009 | Utsunomiya | 360/294.4 |
| 7,630,175 B2* | 12/2009 | Yamazaki et al. | 360/294.4 |
| 7,671,519 B2 | 3/2010 | Kear et al. | |
| 7,974,045 B2* | 7/2011 | Kwon et al. | 360/294.4 |
| 8,085,508 B2 | 12/2011 | Hatch | |
| 8,148,877 B2 | 4/2012 | Jiang et al. | |
| 8,248,735 B2* | 8/2012 | Fujimoto et al. | 360/294.4 |
| 8,369,047 B2* | 2/2013 | Fujimoto et al. | 360/294.4 |

* cited by examiner

*Primary Examiner* — Mark Blouin
(74) *Attorney, Agent, or Firm* — Intellectual Property Law Offices of Joel Voelzke, APC

(57) ABSTRACT

A PZT microactuator for a disk drive suspension has a first electrode on a majority of its top surface, a second electrode on a majority of its bottom surface, the first electrode extending to a small portion of the bottom surface through a via filled with a conductive material such as conductive epoxy. The microactuator may be cut near the via during manufacturing in order to separate it from the bulk PZT material. Alternatively, the microactuator may be cut through the via in which case the via becomes a conductive column at the side edge of the microactuator. The conductive column may be coated with an encapsulant in order to prevent particle shed from the cut material.

21 Claims, 5 Drawing Sheets

US 8,773,820 B1

PZT MICROACTUATOR FOR DISK DRIVE SUSPENSION HAVING ELECTRICAL VIA AND WRAP-AROUND ELECTRODE

CROSS-REFERENCE TO RELATED APPLICATIONS

This application claims priority from U.S. provisional patent application Ser. No. 61/767,620 filed Feb. 21, 2013.

BACKGROUND OF THE INVENTION

1. Field of the Invention

This invention relates to the field of suspensions for hard disk drives. More particularly, this invention relates to the field of a PZT microactuator for a disk drive suspension, the PZT having an electrical via and/or a wrap-around electrode for simplified electrical interfacing, and a method of making the same.

2. Description of Related Art

Magnetic hard disk drives and other types of spinning media drives such as optical disk drives are well known. Disk drive suspensions are the assemblies that hold the read/write head over the correct place on the spinning data disk, in order to write data to, and read data from, the desired data track on the disk.

Both single stage actuated disk drive suspensions and dual stage actuated (DSA) suspension are known. In a single stage actuated suspension, only a voice coil motor moves the disk drive suspension. In a DSA suspension, as for example in U.S. Pat. No. 7,459,835 issued to Mei et al. as well as many others, in addition to the voice coil motor which moves the entire suspension, at least one secondary actuator, often referred to as a microactuator, is located on the suspension in order to effect fine movements of the magnetic head slider to keep it properly aligned over the data track on the spinning disk. The microactuator(s) provide much finer control and much higher bandwidth of the servo control loop than does the voice coil motor alone, which effects relatively coarse movements of the suspension and hence the magnetic head slider. Lead zirconium titanate is one of the broadly used intermetallic inorganic compounds possessing piezoelectric properties and is commonly referred to as PZT. PZTs are often used as the microactuator motor, although other types of microactuator motors are possible. Examples of a dual stage actuated suspension, a PZT microactuator, and various methods of electrically and mechanically integrating the PZT into the suspension, are disclosed in U.S. Pat. No. 8,570,688 to Hahn, and in copending U.S. patent application Ser. No. 14/045,773. Other mechanical and electrical connections have been proposed.

PZTs having wrap-around electrodes, so that both the plus and the minus electrodes can be located on the same face of the PZT for simplified electrical connections, have been proposed. U.S. Pat. No. 6,716,363 to Wright et al. suggests sputtering metal onto the top and bottoms surfaces and onto at least one side of a PZT in order to produce a PZT microactuator having a wrap-around electrode.

SUMMARY OF THE INVENTION

Generally speaking, the present invention is of a PZT microactuator having a wrap-around electrode, and a method of manufacturing such a device. The PZT includes an electrical via and/or a wrap-around electrode. Both the ground electrode and the driving voltage contact are provided on the same side of the PZT, thus allowing for the simplified connections thereto.

In one illustrative embodiment the PZT element of the microactuator has a hole drilled through it that is filed with a conductive material such as conductive epoxy to form a conductive via. The via is near an end of the device but not at the end. The via electrically connects together metallized portions of the top and bottom surfaces. Strictly speaking, in this embodiment there is no electrode that wraps around the end of the device; instead, the electrical connection extends through the interior of the device.

In another illustrative embodiment the PZT element has a conductive column at the end of the device that wraps the electrode around from part of the top surface to part of the bottom surface. The process for making the device includes starting with a piece or wafer of bulk PZT material, drilling holes in the device and filling those holes with a conductive material such as conductive epoxy, metalizing top and bottom sides of the device using an appropriate mask so that only individual islands of metallization are formed on the bottom side rather than a continuous film of metallization covering the entire bottom side. Individual devices are then singulated from the wafer with half of the cuts being made in the conductive vias so as to separate each PZT element into two halves, with the left half belonging to a first resulting PZT microactuator and the right half belonging to a second resulting PZT microactuator. If the holes drilled are round holes then each PZT microactuator has a conductive column that generally takes the form of a half rod at one end of the device, the half rod being the portion of the electrode that wraps around from the top surface to the bottom surface.

DETAILED DESCRIPTION OF THE PREFERRED EMBODIMENTS

Figure 1:
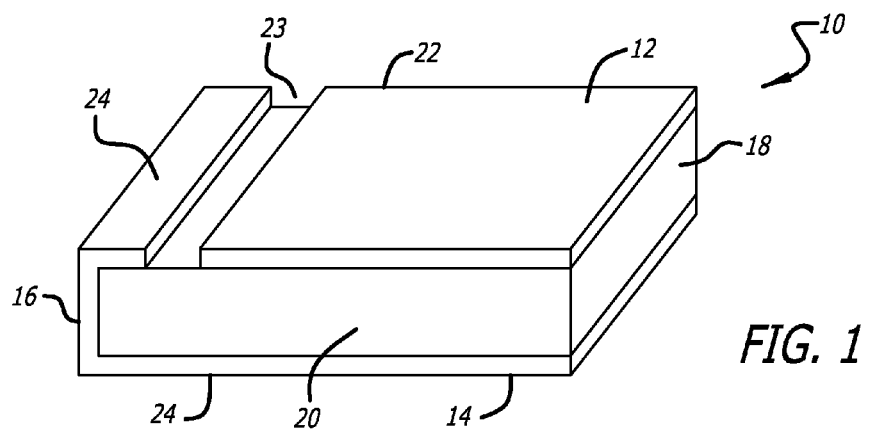
FIG. 1 is a bottom perspective view of a generalized PZT microactuator having a wrap-around electrode.

FIG. 1 is a bottom perspective view of a generalized PZT microactuator having a wrap-around electrode. Because the side that is facing up in the figure will often be placed downward when the microactuator is being installed into the suspension assembly, that side will be referred to as the "bottom" side even though it is facing up in the figure. Likewise, the side that is facing down in the figure will be referred to as the "top" side. In the discussion that follows the piezoelectric material or element will be referred to simply as a "PZT" for simplicity of discussion, it being understood that the discussion applies equally to types of piezoelectric material other than lead zirconate titanate (PZT).

Generalized PZT microactuator 10 has a PZT element 20, a top side 14, a bottom side 12, and two ends 16, 18 that extend between the top and bottom sides. A first electrode 22 has a surface area that constitutes a majority of the surface area of bottom side 12. A second electrode 24 is the wrap-around electrode. The wrap-around electrode 24 includes both at least a majority of the top side 14, the end 16, and a minority of bottom side 12. Electrodes 22, 24 conventionally are metalized surfaces of the PZT element 20. Surfaces of the PZT may be metallized such as by sputtering. In general, therefore, a PZT having a wrap-around electrode includes a first electrode that includes a majority of the bottom side, and a second electrode that includes a minority of the bottom side, an end surface, and at least a majority or all of the top side. The PZT can be actuated by applying either a differential voltage to the electrodes, or by applying a plus voltage to one of the electrodes and grounding the other electrode. Because both electrodes 22, 24 are located on the bottom side of PZT microactuator 10, the device can be activated by applying a voltage across two different parts of the bottom side thereof. Generally speaking, PZT microactuators having wrap-around electrodes allow for simplified electrical connections thereto, as compared to PZT microactuators whose electrodes can only be accessed from opposing sides of the device.

Figure 2:
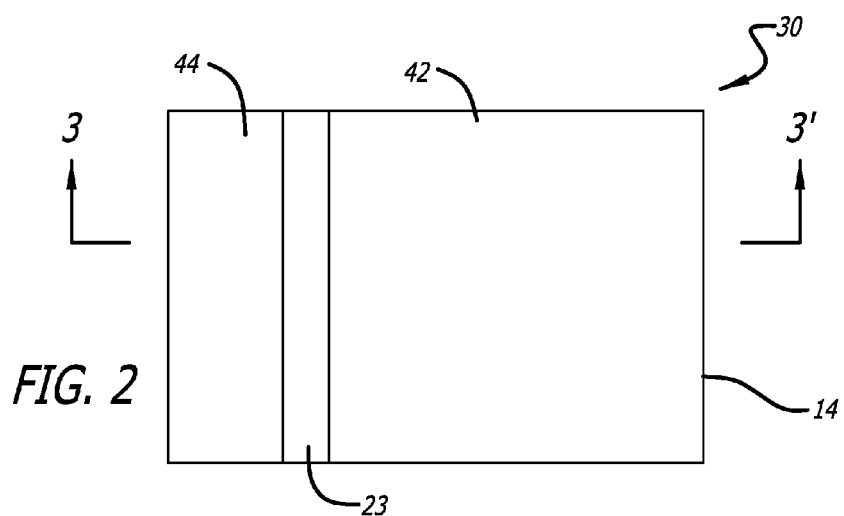
FIG. 2 is a bottom plan view of a PZT microactuator having a wrap-around electrode according to a first illustrative embodiment of the invention.
Figure 3:
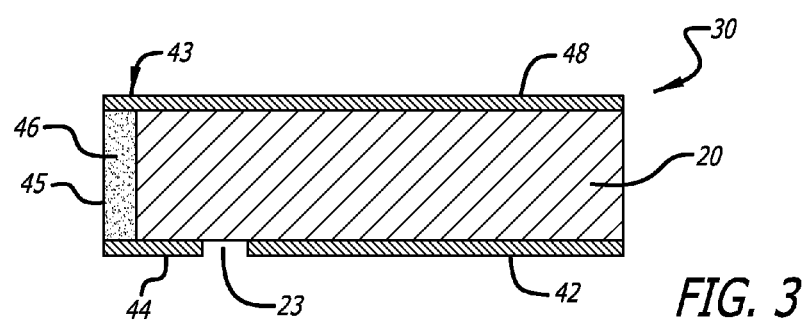
FIG. 3 is cross sectional view of the PZT microactuator of FIG. 2 taken along section line 3-3'.

FIG. 2 is a bottom plan view of a PZT microactuator having a wrap-around electrode according to a first illustrative embodiment of the invention, and FIG. 3 is a cross sectional view of the PZT of FIG. 2 taken along the section line 3-3'. According to this first illustrative embodiment, PZT microactuator 30 includes a PZT element 20, a first or bottom electrode 42, and a second and wrap-around electrode 43. Wrap-around electrode includes a small strip 44 of metalized area on the bottom surface of the device, a metallized area 48 on the top of the device and a wrap-around portion created by a conductive material 46 such as conductive adhesive, and more particularly hardened conductive epoxy, on side wall 45 of the device. A gap 23 in the metallization electrically isolates first electrode 42 on the bottom side from small strip 44 of metallization on the bottom side. Gap 23 can be formed by masking during the step of metalizing the bottom surface of the device. The first electrode 42 defines a first conductive surface, the small strip 44 of metalized area defines a second conductive surface, and metalized area 48 defines a third conductive surface, with the second and third conductive surfaces together with conductive epoxy 46 defining the wrap-around electrode. Conductive epoxy 46 is a conductive column that is generally in the shape of a half-rod as will be apparent from the discussion below of an illustrative manufacturing process.

Figure 4A:
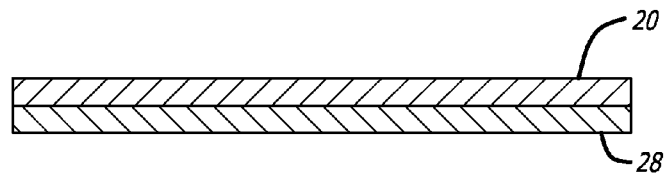
FIGS. 4A-4G are side elevation cutaway views illustrating a manufacturing process according to an embodiment of the invention.
Figure 4B:
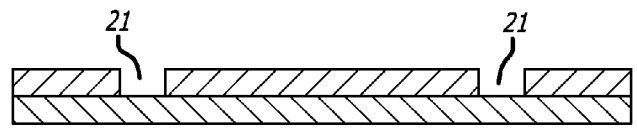
Figure 4C:
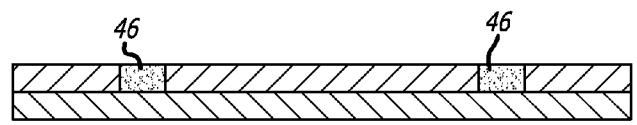
Figure 4D:
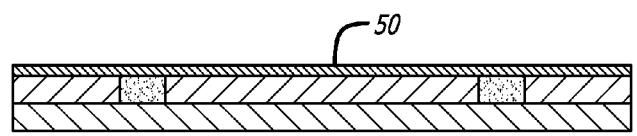
Figure 4E:
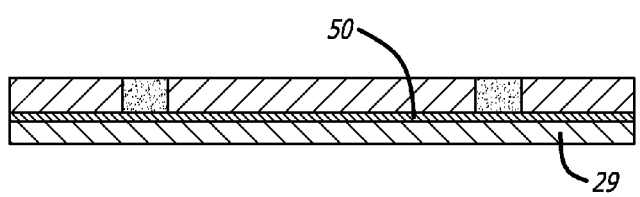
Figure 4F:
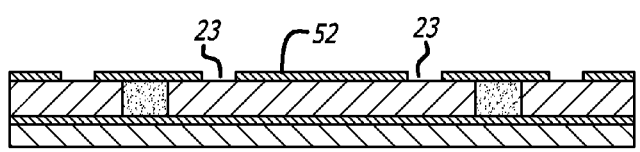
Figure 4G:
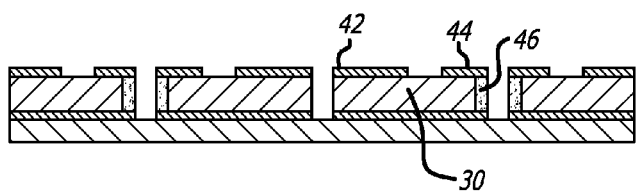
Figure 4H:
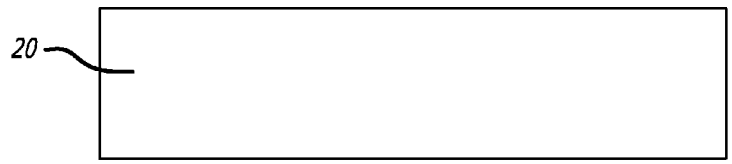
FIGS. 4H-4K are top plan views of the PZT element shown in process step FIGS. 4A-4D.
Figure 4I:
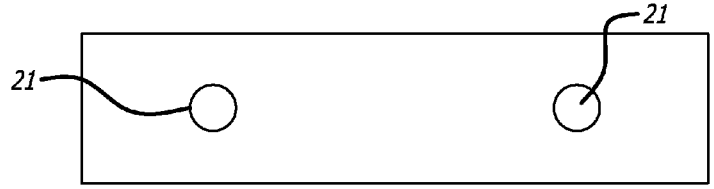

FIGS. 4A-4G are side elevation cutaway views illustrating a manufacturing process according to an embodiment of the invention. FIGS. 4H-4K are top plan views of the PZT element 20 shown in process step FIGS. 4A-4D showing the side of PZT element 20 that is exposed during those steps, respectively. Similarly, FIGS. 4L-4N are bottom plan views of the PZT element shown in process step FIGS. 4E-4G showing the side of PZT element 20 that is exposed during those steps, respectively.

Figure 4J:
Figure 4K:
Figure 4L:
FIGS. 4L-4N are bottom plan views of the PZT element shown in process step FIGS. 4E-4G.
Figure 4M:
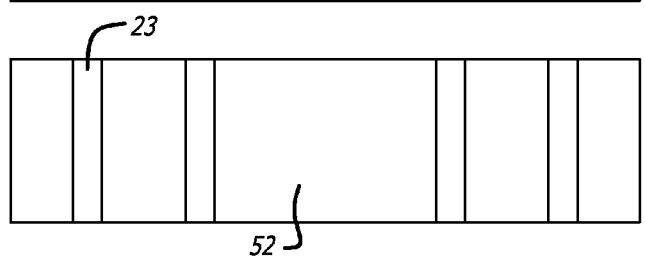
Figure 4N:
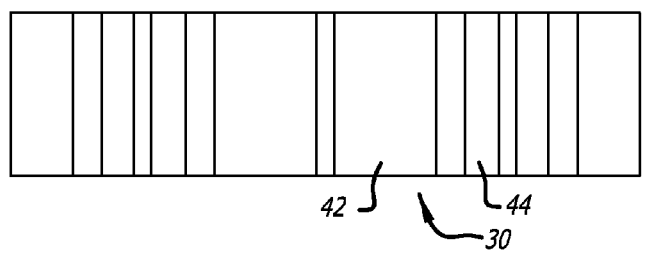

FIGS. 4A-4N illustrates one illustrative manufacturing process for producing a PZT according to the present invention. According to the process, in FIG. 4A a bulk PZT element 20 is placed onto a first substrate 28. In FIG. 4B holes 21 are formed in PZT element 20 such as by laser drilling or etching. In FIG. 4C the holes 21 are filled with conductive material 46 such as conductive epoxy. Conductive epoxy 46 can be epoxy containing silver particles that impart electrical conductivity to the epoxy. Conductive material 46 is then hardened such as by allowing the conductive epoxy to cure over time. Holes 21 can be round holes or they can have other shapes such as generally rectangular.

In FIG. 4D a metalized conductive surface 50 is formed on the PZT and over the epoxy-filled holes such as by sputtering a thin metal layer to form part of what will become the second and wrap-around PZT electrode 43.

In FIG. 4E the PZT element is then removed from the first substrate and flipped over onto a second substrate. In FIG. 4F metalized areas 52 are selectively formed on the exposed bottom surface, such as by masking off the areas for which metallization is not desired and sputtering a metal layer onto the unmasked areas, thereby leaving gaps 23 between the metalized areas that electrically isolate the different areas of metallization. Alternatively, the entire surface could be sputtered, with the metallization selectively obliterated such as by scribing, chemical etching or laser etching to form gaps 23. The holes 21 through the PZT filled with conductive epoxy 46 now define electrical vias that electrically connect together the metallized top surface 50 with selected metallized portions of the bottom surface.

In FIG. 4G the PZT element 20 is then diced in order to singulate out the individual PZT microactuators 30. The dicing is preferably performed by mechanical sawing, typically producing side walls that are vertical, i.e., at an angle of approximately 90°±2° relative to the top and bottom surfaces of PZT element 20. In this embodiment the saw cuts are made on a plane that extends through each electrical via 21 so as to leave some of the epoxy on the end of what will be a first PZT microactuator, and some of the epoxy on the end of what will be a second PZT microactuator. Because each via, which constitutes a generally cylindrical rod is cut vertically through it, each resulting PZT device has a conductive column at its end that is generally in the form of a half-rod, i.e., a rod that has been cut in half with the cut extending along the axis of the rod. The half-rod is disposed in a trench that is located on the end of the PZT element, the trench representing the half of hole 21 that is left when the dicing is performed through the via. The result is a first PZT element 30 having a first electrode that comprises a first metallized surface 42 that constitutes a majority of the bottom surface area, and a wrap-around electrode 43 that comprises a top metallized surface, a second portion that comprises a second metallized surface 44 that comprises a minority of the bottom surface area, and a generally vertical conductive column 46 disposed in a trench that is the end of the device, the conductive column wrapping the voltage around from the bottom to the top surface of the device. The second PZT element is identical.

Preferably the exposed conductive epoxy 46 on the edge of the PZT element is coated with an encapsulant in order to prevent the PZT microactuator 30 from shedding epoxy and silver particles during operation which could contaminate the disk drive and even potentially cause the read/write head to crash onto the disk platter or severely damage it. Similarly, the exposed and cut end of the PZT element is also coated with an encapsulant in order to prevent the sawed end form shedding PZT particles during operation which could also cause contamination problems.

Figure 5:
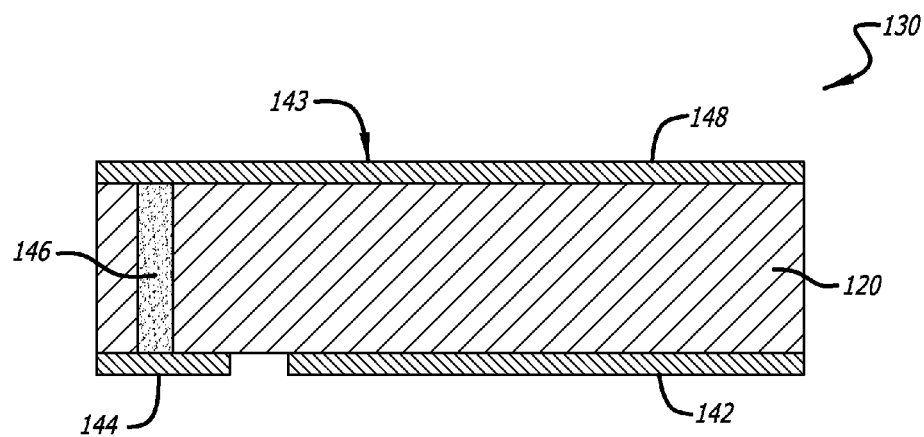
FIG. 5 is a sectional view of a PZT microactuator having a wrap-around electrode according to a second illustrative embodiment of the invention.

FIG. 5 is a sectional view of a PZT microactuator having a wrap-around electrode 143 according to a second illustrative embodiment of the invention. In this embodiment the PZT wafer is not diced through the conductive epoxy 146 in the via. Rather, the PZT wafer is diced through the PZT material at a point that is near, but not at, the via. The electrically conductive path from the bottom electrode to the top electrode is thus through the PZT, not around its side edge. In the finished device the via is thus surrounded on all sides in two dimensions by piezoelectric material. The finished device thus has a first electrode that comprises a first metallized surface 142 that constitutes a majority of the bottom surface area, and a wrap-around electrode 143 that comprises a top metallized surface 148, a second portion that comprises a second metallized surface 144 that comprises a minority of the bottom surface area, and a conductive via through the device that conducts voltage from the bottom to the top surface of the device.

In this embodiment no conductive epoxy is exposed by the dicing operation. This embodiment should be less prone to shedding of particles during the dicing operation, because the conductive epoxy is not sawed through. The cut ends of the PZT element may be coated with an encapsulant to prevent particle shed during operation.

The process of producing microactuator 130 would be similar to the process illustrated in FIGS. 4A-4N, with a pair of holes 21 being drilled relatively close together and filled with conductive epoxy 46 where only one hole 21 is shown in FIG. 4J. The dicing would be performed by cutting between the pair of holes.

Figure 6:
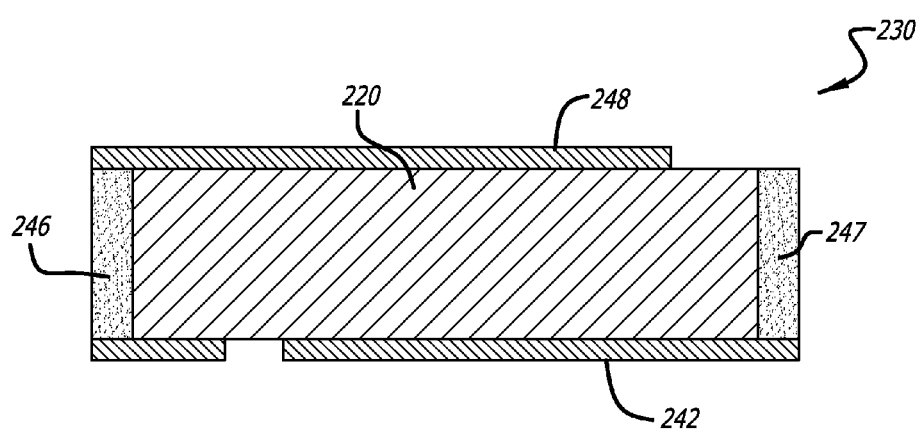
FIG. 6 is a sectional view of a PZT microactuator having wrap-around electrodes according to a third illustrative embodiment of the invention

FIG. 6 is a sectional view of a PZT microactuator having wrap-around electrodes according to a third illustrative embodiment of the invention. In this embodiment the PZT wafer 220 is diced through the conductive epoxy 246, 247 within the vias on both sides of the PZT element. The metallization 248 on the top surface does not extend all the way to the right side conductive edge where conductive epoxy 247 is located. The result is a PZT microactuator whose first and second electrodes are each exposed at respective side edges. That is, the first or ground electrode 242 is exposed at a first side edge, and the second or driving voltage electrode is exposed at a second and opposite side edge.

Figure 7:
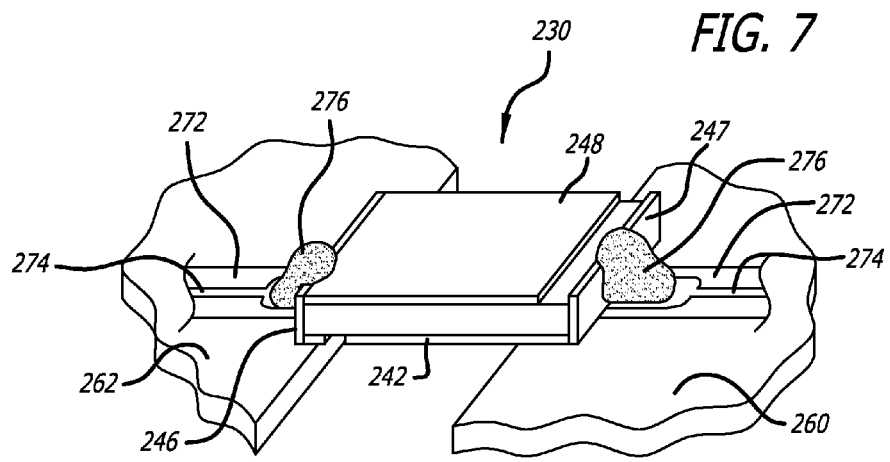
FIG. 7 is a is a top perspective view of the PZT microactuator of FIG. 6 installed in a suspension assembly

A PZT structure such as the embodiment of FIG. 6 in which one or both of the side walls of the device are, or include, part of the electrodes of the device can be used with a solder ball bonding process. FIG. 7 is a top perspective view of the PZT microactuator of FIG. 6 installed in a suspension assembly. The suspension assembly includes stainless steel portions 260 and 262, and flexible circuits that include copper layer 274 over an insulating layer 272 such as polyimide over the stainless steel. Solder balls 276 are heated in place until they flow and bond to a copper bonding pad on copper layer 274 and to the conductive adhesive 246, 247 on the left-side and right-side side walls of the microactuator 230 which can be vertical sidewalls. In this configuration the PZT microactuator is adhered to, but electrically isolated from, stainless steel portions 260, 262 by non-conductive epoxy.

Figure 8:
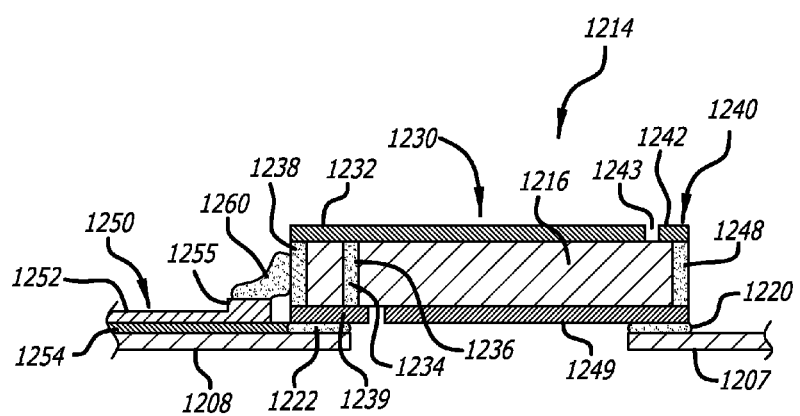
FIG. 8 is a sectional view of a PZT microactuator having wrap-around electrodes according to a fourth illustrative embodiment of the embodiment.

FIG. 8 is a sectional view of a PZT microactuator having wrap-around electrodes according to a fourth illustrative embodiment of the embodiment, bonded to a suspension. This embodiment incorporates various features also found in the other embodiments, including both a conductive via 1234 and one or more conductive columns on the side walls. PZT microactuator 1214 includes a PZT element 1216, a ground electrode 1240, and a drive electrode 1230. Drive electrode 1230 includes a top metalized portion 1232, a bottom metalized portion 1239, a via 1234 filled with a conductive material 1236 such as conductive epoxy, and a conductive column 1238 on the left side edge that is formed as described in the previous embodiments. Both conductive via 1234 and conductive column 1238 carry the driving voltage from metalized portion 1239 to metalized portion 1232. In this particular environment for the device, the exposed conductive column 1238 on the side is used as the electrical contact pad. Solder ball 1260 conducts the drive voltage to conductive column 1238 from copper contact pad 1255 which is part of copper layer 1252 over polyimide 1254 in suspension circuit 1250. Conductive via 1234 and conductive column 1238 provide parallel electrical paths that electrically connect together metallized portion 1239 on the bottom surface of the device and metallized area 1232 of the top surface. Gap 1243 between metallized area 1232 and metallized area 1242 provides electrical isolation between those two areas and hence between the electrodes. Gap 1243 is located far enough away from the right side end of the device such that any solder from a solder ball bonding process which flows over the top of that end of the device will not electrically short out to electrode 1230.

Ground electrode 1240 includes bottom metalized portion 1249, right side conductive column 1248, and top metalized portion 1242. In this particular environment, top metalized portion 1242 and right side conductive column 1248 are not necessary. In other environments and depending on the particular configuration of the suspension and its electrical circuit and connection(s), the portions of the electrodes that are not actually needed in the figure as shown, could be used. PZT microactuator 1214 is therefore a versatile device that can be used with different suspension and circuit configurations.

In all of the embodiments, the microactuator may have multiple vias electrically in parallel for improved electrical conduction and/or strength, or robustness in case one of the vias should fail for some reason. In the embodiments in which the cuts are not made through the vias, the final device would have two or more vias electrically connecting together the top and bottom portions of the wrap-around electrode. In the embodiments in which the cuts are made through the vias, the final device would have multiple columns of conductive epoxy on its end. If the device is solder ball bonded, the solder ball would be touching and hence electrically connected to both of the exposed columns of conductive epoxy, or more generally, to all of the plurality of exposed columns of conductive epoxy.

In the embodiments described above, the conductive vias are in electrical contact with the PZT along the entire z-dimension of the PZT. It would improve the stroke length of the device somewhat to provide vias that are electrically insulated from the PZT except at the ends thereof. Such insulated vias could be fabricated such as by filling the vias with an insulating material such as non-conductive epoxy, and then drilling a smaller hole through the insulating material and filling that smaller hole with conductive epoxy. The result would be an insulating tube through which the via extends from the top end of the PZT to the bottom end. Such a structure would be more complicated and costly to produce.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

It will be understood that the terms "generally," "approximately," "about," "substantially," "coplanar, "vertical," and the like as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A piezoelectric microactuator for use in a disk drive suspension, the piezoelectric micro actuator comprising:
    a piezoelectric element having a top side, a bottom side opposite the top side, and an end that extends between the top and bottom sides;
    a first conductive surface covering a first part of the bottom side, the first conductive surface defining a first electrode;
    a second conductive surface covering a second part of the bottom side, the second part having a smaller surface area than the first part;
    a third conductive surface covering at least a part of the top side; and
    a via extending through the piezoelectric element, the via containing a conductive material, the via being located close to the end of the piezoelectric element but not at the end such that the via is surrounded on all sides in two dimensions by piezoelectric material, the via providing a conductive path from the second conductive surface to the third conductive surface, the second and third conductive surface collectively defining a second electrode;
    whereby the microactuator has a first electrode on a first part of the bottom side and a second electrode that includes both a second part of the bottom side and at least part of the top side, such that the microactuator can be activated by applying a voltage across two different parts of the bottom side thereof.

2. The piezoelectric microactuator of claim 1 wherein the conductive material in the via is conductive epoxy.

3. The piezoelectric microactuator of claim 1 further comprising:
    a second via extending through the piezoelectric element, the second via containing conductive material, the second via being electrically in parallel with the first via.

4. The piezoelectric microactuator of claim 1 further comprising:
    a hardened conductive adhesive on said end, the hardened conductive adhesive being electrically in parallel with the via.

5. The piezoelectric microactuator of claim 1 wherein the second conductive surface is a metallization that covers the conductive material in the conductive via.

6. A piezoelectric microactuator for use in a disk drive suspension, the piezoelectric microactuator comprising:
    a piezoelectric element having a top side, a bottom side opposite the top side, and an end between the top and bottom sides;
    a first conductive surface covering a first part of the bottom side, the first conductive surface defining a first electrode;
    a second conductive surface covering a second part of the bottom side, the second part having a smaller surface area than the first part;
    a third conductive surface covering at least a part of the top side; and
    conductive adhesive on the end of the piezoelectric microactuator and extending from the second conductive surface on the bottom side to the third conductive surface on the top side thereby electrically connecting together respective portions of the top and bottom sides;
    whereby the microactuator has a first electrode on a first part of the bottom side and a second electrode that includes both a second part of the bottom side and part of the top side, such that the microactuator can be activated by applying a voltage across two different parts of the bottom side thereof.

7. The piezoelectric microactuator of claim 6 wherein the conductive adhesive comprises a generally vertical column of conductive adhesive disposed in a trench in the end of the piezoelectric element.

8. The piezoelectric microactuator of claim 6 further comprising an encapsulating material covering the conductive adhesive.

9. The piezoelectric microactuator of claim 6 further comprising a via electrically connecting the second conductive surface on the bottom side to the third conductive surface on the top side, the via comprising a hole through the piezoelectric element filled with a hardened conductive adhesive.

10. A disk drive suspension including the piezoelectric microactuator of claim 6, wherein the microactuator is electrically connected to a piezoelectric driving voltage via a solder ball that extends from a copper signal pad of a circuit of the suspension to the conductive adhesive on the end of the microactuator.

11. A piezoelectric microactuator having a first electrode that includes a first conductive material that extends onto a left vertical side edge of the microactuator, and a second electrode that includes a second conductive material that extends onto a right vertical side of the microactuator, the second conductive material being in electrical contact with metalized top and bottom portions of the microactuator.

12. The piezoelectric microactuator of claim 11 wherein the first and second conductive materials are conductive epoxy.

13. The piezoelectric microactuator of claim 11 further comprising an encapsulating material over the first and second conductive materials, the encapsulating material preventing shedding of particles of said first and second conductive materials from the left and right vertical sides.

14. A process for forming a piezoelectric microactuator comprising:
forming a hole through a piezoelectric element;
filling the hole with a flowable and hardenable conductive material thereby defining a conductive via through the piezoelectric element;
hardening the conductive material;
depositing a metal layer onto a top surface of the piezoelectric element;
forming first and second metalized areas on the bottom surface of the piezoelectric element, the first and second metalized areas being electrically separated from one another;
wherein the first metalized area on the bottom surface of the piezoelectric element is in electrical communication with the conductive via and the metal layer on the top surface; and
cutting said piezoelectric element material along a vertical plane through the conductive via such that the piezoelectric element is separated into two metalized piezoelectric elements, each metalized piezoelectric element having a conductive path including the hardened conductive material that extends from the top surface to the bottom surface.

15. The process of claim 14 wherein the conductive via comprises a plurality of conductive vias, and the cutting is performed along a vertical plane that extends through said plurality of conductive vias.

16. The process of claim 14 wherein the step of depositing a metal layer includes depositing the metal layer over the conductive material in the conductive via.

17. The process of claim 14 further comprising:
after the step of depositing a metal layer onto a top surface of the piezoelectric material, flipping the piezoelectric material over.

18. The process of claim 16 further comprising:
solder ball bonding the microactuator to a contact pad which provides a driving voltage for the microactuator, the solder ball bonding utilizing a solder ball that extends from the contact pad to said exposed plurality of conductive vias.

19. A process for forming a piezoelectric microactuator comprising:
forming at least one hole through a piezoelectric element;
filling the hole with a flowable and hardenable conductive material thereby defining a conductive via;
hardening the conductive material;
depositing a metal layer onto a top surface of the piezoelectric element;
forming first and second metalized areas on the bottom surface of the piezoelectric element, the first and second metalized areas being electrically separated from one another;
wherein the first metalized area on the bottom surface of the piezoelectric element is in electrical communication with the conductive via and the metal layer on the top surface; and
cutting said piezoelectric element such that said piezoelectric element is separated into first and second metalized piezoelectric elements, the first metalized piezoelectric element having on its bottom surface a first metalized area that is in electrical communication through said conductive via with a majority of the top surface of the metalized piezoelectric element, and also having a second metalized area on its bottom surface that extends over a majority of the bottom surface of the metalized piezoelectric element.

20. The process of claim 19 wherein the conductive via defines a first conductive via, the method further comprising:
forming a second hole through the piezoelectric element;
filling the second hole with the flowable and hardenable conductive material thereby defining a second conductive via;
wherein the cutting step comprises cutting the piezoelectric elements between the holes to produce two piezoelectric elements each having a conductive via therethrough connecting respective electrodes on respective top and bottom surfaces of the piezoelectric elements.

21. The process of claim 19 wherein:
the cut is made along a vertical plane passing through said via such that the piezoelectric element is separated into two metalized piezoelectric elements, each metalized piezoelectric element having hardened conductive adhesive at its end electrically connecting at least a portion of the metallized top surface to a portion of the metallized bottom surface.

* * * * *